Patented Aug. 30, 1932

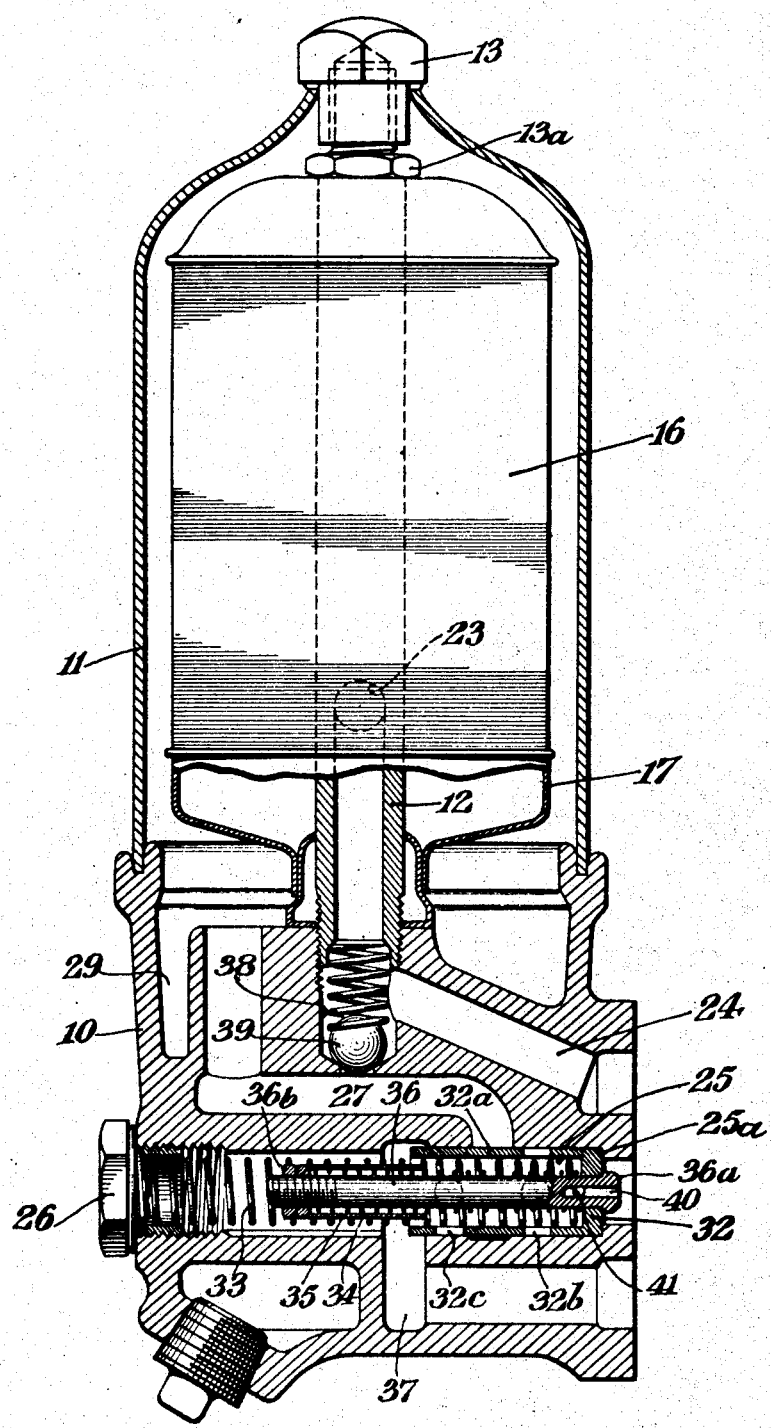

1,874,847

UNITED STATES PATENT OFFICE

GEORGE A. ARNOLD, OF WEST HAVEN, CONNECTICUT, ASSIGNOR TO MOTOR IMPROVEMENTS, INC., OF NEWARK, NEW JERSEY, A CORPORATION OF DELAWARE

VALVE

Application filed July 7, 1930. Serial No. 465,960.

This invention relates to improvements in filtering systems for removing and recovering solid substances suspended in fluids.

In the co-pending application of R. P. F. Liddell, Serial No. 467,213 there is disclosed a filtering system having provision for directing filtered fluid reversely through the filter unit for the purpose of removing from the same the solid material filtered from the fluid and collected by the filter unit on its surface. In the filtering system disclosed in the said Liddell application, in addition to means for causing fluid containing undesirable solid substances to flow through the filter unit, means are provided for utilizing the filtered fluid flowing from the filter unit to build up a supply of potential energy and are so constructed and arranged as to permit the utilization of the potential energy thus built up to force filtered fluid reversely through the filter unit upon cessation of the flow of contaminated fluid through said unit. The reverse flow of filtering fluid through the filter unit depends upon the temporary reduction of the pressure applied to the contaminated fluid below that to which the filtered fluid is subjected.

An object of this invention is to provide means for insuring a quick reduction of the pressure applied to the contaminated fluid so that the material on the surface of the filter unit is subjected to a quick high pressure "kick."

Other objects, novel features and advantages of this invention will be apparent from the specification and accompanying drawing, wherein is disclosed a section through a filter including the invention.

The single figure discloses a filter comprising a base 10 and a cover 11. A hollow stud 12 is threaded to the base 10 and a clamping member 13 is threaded on the upper end of the stud. A nut 13a clamps in position the filter unit 16 through which the stud 12 extends. The structure of the filter unit and the supporting drum is the same as that shown in the said Liddell application.

In the base 10 there is provided an outlet channel 24 communicating with the lower end of the stud 12 in which is provided a port 23 communicating with the interior of the drum 17. Also in the base there is provided an inlet channel comprising a cylindrical valve chamber 25 from which a conduit 27 leads to the space between the cover 11 and unit 16. In the valve chamber 25 there is slidably mounted a piston 32 having a cylindrical skirt 32a. A spring 33 is provided for urging the piston 38 toward the shoulder 25a which limits its movement of the piston. One end of the spring 33 is seated in a recess in a plug 26 threaded into the end of the valve chamber 25. One end of a spring 34 projects into the piston 32 and the other end is seated in a cup 35 carried by a rod 36 which extends through the cup, spring and piston and is provided with a head 36a at one end and a nut 36b at the other end, the rod being slidable relative to the piston. A vent conduit 37 leads from the valve chamber 25, and the skirt 32a of the piston 32 is provided with axially spaced apertures 32b and 32c. The arrangement of the conduits 27 and 37 and the ports 32b and 32c is such that when the piston 32 engages the shoulder 25a, the conduit 27 is closed off and when the piston moves to the left communication between the conduits 27 and 37 is established through the ports 32b and 32c. Further movement of the piston closes off the conduit 27 from the conduit 37 and after the piston 32 has been moved sufficiently, communication is established from the valve chamber 25 into the conduit 27. When the valve is in this position oil will flow into the filter casing. On the return movement of the valve, the conduit 27 will be temporarily put in communication with the conduit 37. In the right hand end of the rod 36 there is provided a by-pass consisting of a longitudinal bore 40 having a transverse port 41. Relative movement of the piston 32 and the rod 36 is effective to close the port 41.

The filter above described is adapted to be used in the same manner as the filter described in said Liddell application and is connected in the lubricating system of an internal combustion engine in the same manner as disclosed in Fig. 4 thereof. Dirty oil from the pump is delivered to the passage 25 and presses back the piston 32 to open the conduit 27 whereupon the dirty oil flows through the passage 27 into the interior of the filter. A slight amount of oil flows through the by-pass and passes back by way of the conduit 37 to the sump. The amount of oil thus by-passed is so small that it does not affect the operation of the piston 32 and as long as the pump is operating the piston 32 will be held sufficiently far to the left to uncover the conduit 27. When the pump is stopped and oil ceases to flow into the filter, the spring 33 forces the piston to the right. The by-pass in the rod 36 permits oil to escape therethrough, thus permitting the spring to move the piston quickly to the right until it engages the shoulder 25a. Upon registration of the ports 32b and 32c with the conduits 27 and 37, the desired reverse flow of oil is established. The reverse flow of oil is thus effected before any substantial reduction of pressure occurs in the drum so that the maximum pressure differential through the filter unit is obtained. The flow is only momentary due to the continued movement of the piston to the right. The amount of oil which flows reversely through the unit is therefore limited.

The amount of reverse flow is so limited as to prevent the passage of any of the removed filter cake out of the filter. This filter cake is deposited in the settling chamber 29 at the bottom of the filter during periods of rest of the system. The pressure applied by the reversely flowing oil to the filter cake is substantially the same as the pressure existing in the system during normal operation thereof, for such pressure is retained within the drum 17 until communication is established between the conduits 27 and 37 at which time the pressure in the space between the filter unit and the casing drops practically to zero. The filter cake is thus given an equally high pressure "kick" which effectively clears the surface of the filter unit, thus insuring efficient operation of the unit.

A relief valve 39 in the by-pass 38 between the inlet and outlet channels insures flow of oil to the bearings in the event that the filter unit also is clogged or the oil is too stiff, as at starting the engine, to flow through the filter unit in proper quantity to lubricate the bearings.

The piston 32 also serves to prevent excessive pressure in the system. Under operating pressure, the piston 32 merely moves to the left sufficiently to put the conduit 27 in communication with the passage 25. In this position, the rod 36 engages the rear wall of the passage and the spring 34, which is considerably stiffer than the spring 33, opposes further movement of the piston. However, if excessive pressure tends to develop in the system, the spring 34 yields to permit the piston 32 to uncover the conduit 37. The piston 32, therefore, acts also as a safety valve. The pressure required to operate the piston 32 to uncover the conduit 37 may be regulated by means of the nut 36b for, by adjusting this nut, the compression of the spring 34 may be varied. In this way, the maximum pressure which can exist in the system may be regulated.

It is, of course, understood that various modifications may be made in the apparatus above described without in any way departing from the spirit of the invention as defined in the appended claims.

I claim:

1. In combination, a cylindrical valve chamber having axially spaced inlet, outlet and vent ports, and a hollow piston slidable in said chamber, said piston having axially spaced lateral ports and a restricted by-pass port leading through its head.

2. In combination, a cylindrical valve chamber having axially spaced inlet, outlet and vent ports, a piston slidable in said chamber and adapted in one position to close communication between ports and in another position to close said vent port with said inlet and outlet ports in communication, and resilient means tending to oppose movement of said piston from the first to the second position, said piston having provision for establishing communication between said outlet and vent ports when intermediate said first and second positions, and also being provided with a restricted by-pass port for establishing communication between the portions of the chamber on opposite sides of the piston.

3. In combination, a cylindrical valve chamber having axially spaced inlet, outlet and vent ports, a piston slidable in said chamber and adapted in one position to close said inlet port, said piston being provided with a by-pass port for establishing communication between the portions of the chamber on the opposite sides of the piston, resilient means opposing movement of said piston from said position, and a skirt for said piston, said skirt being provided with apertures for establishing communication between said outlet and vent ports in another position of said piston.

4. In combination, a valve chamber, a piston slidably mounted therein, resilient means tending to oppose movement of said piston in one direction, additional resilient means effective after predetermined movement of the piston to oppose further movement of the piston, and means for adjusting the tension of said additional resilient means.

5. In combination, a cylindrical valve chamber, a piston slidable therein, resilient means tending to oppose movement of said piston in one direction, a rod slidably supported by said piston, an abutment on said rod, resilient means interposed between said abutment and said piston, and means for varying the tension of said last named resilient means.

6. In combination, a cylindrical valve chamber, a piston slidable therein, resilient means tending to oppose movement of said piston in one direction, a rod slidably supported by said piston, an abutment on said rod, resilient means interposed between said abutment and said piston, and means for varying the position of said abutment on said rod.

7. In combination, a cylindrical valve chamber having axially spaced inlet, outlet and vent ports, a piston in said chamber and adapted in one position to close said inlet port, resilient means opposing movement of said piston from said position, a rod slidably supported by said piston, said rod being provided with a passage providing communication between the portions of said chamber on opposite sides of the piston, an abutment carried by said rod, additional resilient means interposed between said abutment and said piston, and a skirt for said piston, said skirt being provided with apertures for establishing communication between said outlet and vent ports in another position of said piston.

8. In combination, a cylindrical valve chamber having axially spaced inlet, outlet and vent ports, a piston in said chamber, and adapted in one position to close said inlet port, resilient means opposing movement of said piston from said position, a rod slidably supported by said piston, said rod being provided with a passage providing communication between the portions of said chamber on opposite sides of the piston, an abutment carried by said rod, additional resilient means interposed between said abutment and said piston, a skirt for said piston, said skirt being provided with apertures for establishing communication between said outlet and vent ports in another position of said piston, and means for varying the tension of said additional resilient means.

9. In combination, a cylindrical valve chamber having axially spaced inlet, outlet and vent ports, a hollow piston slidable in said chamber, said piston having axially spaced lateral ports and a restricted by-pass providing communication between the portions of said chamber at opposite sides of the piston, and resilient means tending to hold said piston in position to close said inlet.

In testimony whereof, I have signed my name to this specification.

GEORGE A. ARNOLD.